United States Patent
Wei et al.

(10) Patent No.: US 8,064,766 B2
(45) Date of Patent: Nov. 22, 2011

(54) ORTHOGONAL FREQUENCY DIVISION MULTIPLE ACCESS BASED OPTICAL RING NETWORK

(75) Inventors: Wei Wei, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 600 days.

(21) Appl. No.: 12/207,964

(22) Filed: Sep. 10, 2008

(65) Prior Publication Data

US 2009/0092389 A1    Apr. 9, 2009

Related U.S. Application Data

(60) Provisional application No. 60/978,291, filed on Oct. 8, 2007.

(51) Int. Cl.
*H04B 10/20* (2006.01)
*H04J 14/02* (2006.01)

(52) U.S. Cl. ............... 398/59; 398/82; 398/70; 398/79; 398/48; 398/83; 370/498

(58) Field of Classification Search ............... 398/4, 45, 398/48, 51, 52, 54, 57–59, 70–72, 79, 82, 398/83, 98; 370/294, 337, 338, 351, 352, 370/389, 401, 465, 466, 498, 535; 385/24, 385/46, 147

See application file for complete search history.

(56) References Cited

U.S. PATENT DOCUMENTS

| | | | |
|---|---|---|---|
| 6,222,654 B1 | 4/2001 | Frigo | |
| 6,684,030 B1 * | 1/2004 | Taylor et al. | 398/59 |
| 6,925,259 B2 | 8/2005 | Boroditsky | |
| 6,970,617 B2 * | 11/2005 | Mao et al. | 385/24 |
| 7,164,861 B2 * | 1/2007 | Takachio et al. | 398/70 |
| 7,319,817 B1 | 1/2008 | Frigo | |
| 7,333,726 B2 * | 2/2008 | Kenny et al. | 398/72 |
| 7,433,594 B2 * | 10/2008 | Takachio et al. | 398/4 |
| 7,539,414 B2 * | 5/2009 | Zami et al. | 398/54 |
| 7,599,620 B2 * | 10/2009 | Graves et al. | 398/51 |
| 7,706,688 B2 * | 4/2010 | Boudreault et al. | 398/59 |
| 7,773,883 B1 * | 8/2010 | Weng et al. | 398/83 |
| 2008/0166129 A1 | 7/2008 | Luo | |

OTHER PUBLICATIONS

Wei, W. et al. "Optical Orthogonal Frequency Division Multiple Access (OFDMA)-based Optical Access/Metro Ring Networks", Proc. OFC (2008).
Wei, W. et al., "MAC Protocols for Optical Orthogonal Frequency Division Multiple Access (OFDMA)-based Passive Optical Networks", Proc. OFC (2008).
Hsueh, Y-L, et al., "Traffic Grooming on WDM Rings Using Optical Burst Transport", Journal of Lightwave Technology, vol. 24, No., Jan. 2006.
Lowery, A.J. et al., "Performance of Optical OFDM in Ultralong-Haul WDM Lightwave Systems", Journal of Lightwave Technology, vol. 25, No. 1, Jan. 2007.
Luo, Y. et al., "WDM Passive Optical Network with Parallel Signal Detection for Video and Data Delivery", Prof. OFC (2007).

\* cited by examiner

*Primary Examiner* — Loha Ben
(74) *Attorney, Agent, or Firm* — Joseph Kolodka

(57) ABSTRACT

A fiber optic network transmits data between a hub node and a plurality of local nodes connected by at least one unidirectional fiber ring. Downstream data streams are carried on wavelength-division-multiplexed optical carriers from the hub node to the local nodes. An optical carrier corresponding to a specific wavelength carries downstream data streams to a specific local node. Downstream data streams are multiplexed onto an optical carrier via orthogonal frequency division multiplexing. A parallel signal detector in each local node detects all downstream optical carriers. A signal processing module demultiplexes the data stream from the optical carrier having the specific wavelength corresponding to the local node. An upstream data stream is multiplexed via orthogonal frequency division multiplexing onto an upstream optical carrier having the same specific wavelength and transmitted from the local node to the hub node. Upstream data awaiting transmission is allocated to specific subcarriers and time slots.

30 Claims, 4 Drawing Sheets

ORTHOGONAL FREQUENCY DIVISION MULTIPLE ACCESS BASED OPTICAL RING NETWORK

This application claims the benefit of U.S. Provisional Application No. 60/978,291 filed Oct. 8, 2007, which is incorporated herein by reference.

BACKGROUND OF THE INVENTION

The present invention relates generally to optical transmission (transport) networks, and more particularly to an orthogonal frequency division multiple access based optical ring network.

Optical transmission over fiber has become the primary transmission mode for high-speed voice and data transport for core (backbone) networks. With the increasing customer demand for multi-media services (voice, data, video), optical transmission networks are also being deployed in local access networks and customer premises networks. Core networks are typically under the control of major telecommunications providers and have well-defined architectures and network configurations. Costs are also amortized over many customers. For high-speed transport in local access networks and customer premises networks, however, architectures are not as well-defined. Costs are also amortized over a fewer number of customers. What are needed are optical transmission systems with flexible, adaptive, robust architectures and low-cost components.

BRIEF SUMMARY OF THE INVENTION

In an embodiment, a fiber optic network transmits data between a hub node and a plurality of local nodes connected by at least one unidirectional fiber ring. Downstream data streams are carried on wavelength division multiplexed downstream optical carriers from the hub node to the local nodes. An optical carrier corresponding to a specific wavelength carries downstream data streams to a specific local node. Downstream data streams are multiplexed onto an optical carrier via orthogonal frequency division multiplexing. A single parallel signal detector in the each local node detects all downstream optical carriers. A signal processing module demultiplexes the downstream data stream from the optical carrier having the specific wavelength corresponding to the specific local node. An upstream data stream is multiplexed via orthogonal frequency division multiplexing onto an upstream optical carrier having the specific wavelength and transmitted from a specific node into the at least one unidirectional fiber ring. All upstream data streams are received and processed by the hub node. Upstream data awaiting transmission in a local node is allocated to specific subcarriers and time slots by a control module and a subcarrier and time slot allocation module.

These and other advantages of the invention will be apparent to those of ordinary skill in the art by reference to the following detailed description and the accompanying drawings.

DETAILED DESCRIPTION

Figure 1A:
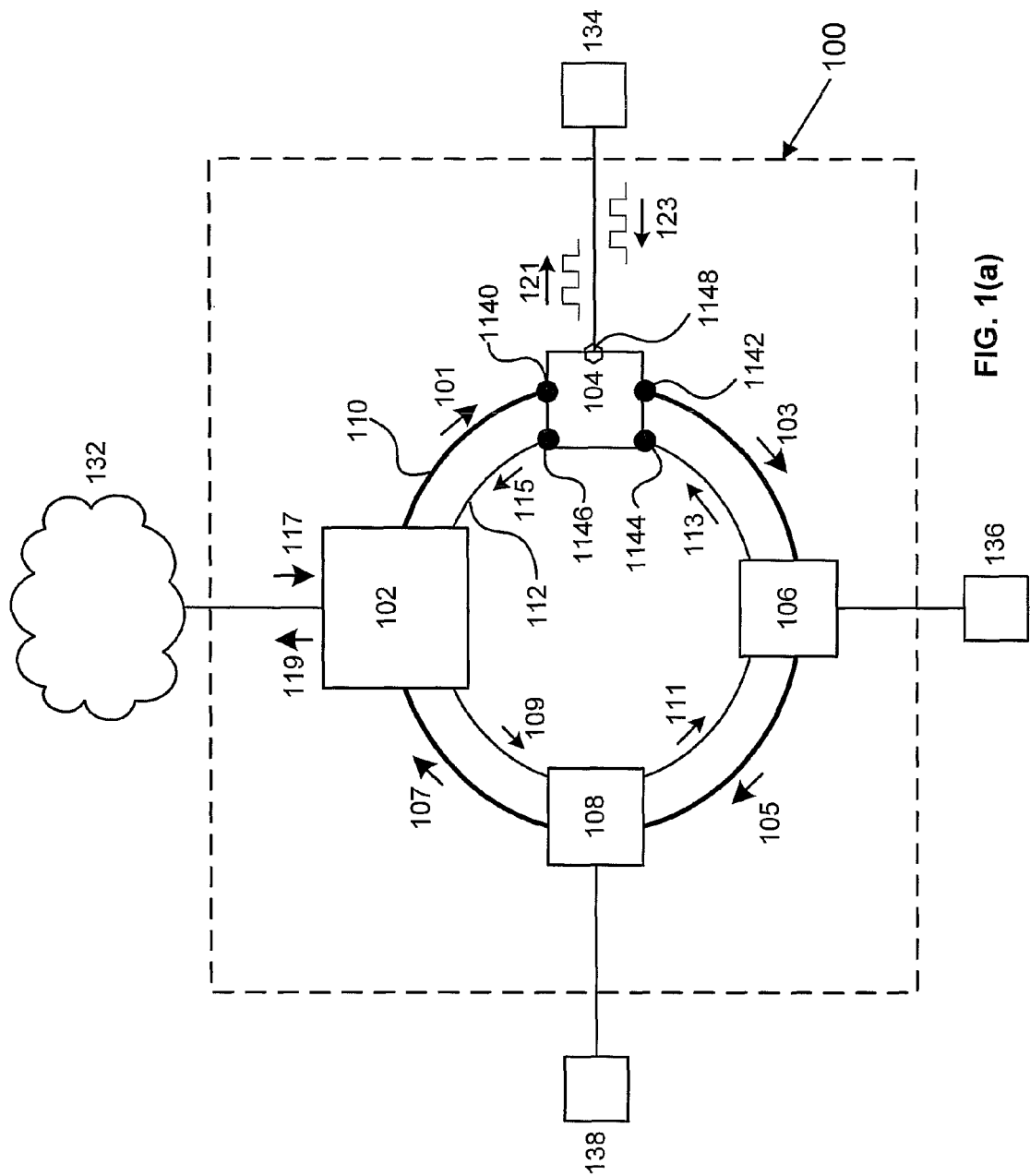
FIG. 1(a) shows a high-level schematic of an optical ring network.

FIG. 1(a) shows a high-level schematic of an optical transmission (transport) network OTN 100. In an embodiment, OTN 100 may have a single-ring architecture. In the embodiment shown in FIG. 1(a), OTN 100 has a dual-ring architecture, which increases network reliability. Examples of applications in which OTN 100 may be deployed include metropolitan access networks and fiber-to-the-premises networks. In the embodiment shown in FIG. 1(a), OTN 100 includes a single hub node HN 102 and three local nodes, LN1 104-LN3 108, which are connected by fiber rings FR 110 and FR 112. In general, there may be multiple local nodes. Herein, a local node is also referred to as an access node and as a local access node.

The two fiber rings form a unidirectional path switched ring (UPSR) network. FR 110 and FR 112 are configured as counter-rotating rings. Working traffic flows clockwise in FR 110, which is referred to as the working ring. Working traffic refers to data streams transported under normal network operating conditions. In the event of a break in FR 110 or of a failure of a local node, traffic may be switched to FR 112, which is referred to as the protection ring. Protection traffic refers to data streams transported under network fault conditions. Protection traffic flows counter-clockwise in FR 112. In the embodiment shown in FIG. 1(a), HN 102 connects to core network 132. Herein, a core network is also referred to as a backbone network. HN 102, for example, may connect to an optical line termination unit in a central office. In an embodiment, OTN 100 may be a stand-alone network. That is, there is no connection between HN 102 and a core network; data is transported among HN 102 and LN1 104-LN3 108 only.

LN1 104-LN3 108 connect to user systems US1 134-US3 138, respectively. Examples of user systems include local area networks and end-user equipment, such as servers, workstations, and personal computers. In the embodiment shown in FIG. 1(a), LN1 104 connects to US1 134 via user interface 1148. In this example, user interface 1148 is an electrical interface. Other user interfaces, such as optical or wireless, may also be deployed.

Traffic is transported within OTN 100 in a broadcast-selective architecture, using the source-stripping mechanism, in which the hub node HN 102 and each local node LN1 104-LN3 108 are able to passively add traffic to and drop traffic from the fiber rings FR 110 and FR 112. HN 102 is responsible for aggregating various types of traffic flows from the local nodes and forwarding them to specified destinations. Herein, downstream traffic refers to data streams transported from a core network to a local node and from a local node to a user system. Upstream traffic refers to data streams transported from a user system to a local node and from a local node to a core network.

In FIG. 1(a), all downstream traffic from core network 132 to OTN 100 is carried via multi-wavelength optical beam OB 117, which carries three wavelength division multiplexed (WDM) optical carriers, with wavelengths $\lambda_1$-$\lambda_3$. Data streams transported (carried) between the hub node HN 102 and a specific local node is transported on an optical carrier with a corresponding specific wavelength assigned to the specific local node. Herein, data streams carried on a specific optical carrier are referred to as data streams corresponding to the specific optical carrier. Herein, an optical carrier carrying specific data streams is referred to as the optical carrier corresponding to the specific data streams. Both downstream and upstream data streams between HN 102 and a specific local node are transported on the same specific wavelength. In the example shown, data streams between HN 102 and LN1 104 are transported on $\lambda_1$ optical carrier; data streams between HN 102 and LN2 106 are transported on $\lambda_2$ optical carrier; and data streams between HN 102 and LN3 108 are transported on 3 optical carrier. Multi-wavelength ($\lambda_1$, $\lambda_2$, $\lambda_3$) optical beam OB 101 corresponds to OB 117 after it has been processed by HN 102. LN1 104 demultiplexes the downstream $\lambda_1$ optical carrier from OB 101. LN1 104 converts the downstream $\lambda_1$ optical carrier to an electrical signal, processes the electrical signal, and transmits the downstream electrical signal ES 121 across user interface 1148 to US1 134. The downstream $\lambda_1$ optical carrier from OB 101 is terminated at LN1 104 to prevent recirculation in FR 110. The downstream ($\lambda_2$, $\lambda_3$) optical carriers are transmitted through LN1 104. Herein, an optical signal may also refer to a set of signals on an optical carrier, and an electrical signal may also refer to a set of signals on an electrical carrier.

Upstream traffic from US1 134 is transmitted via upstream electrical signal ES 123 across user interface 1148 to LN1 104. LN1 104 processes ES 123, converts the processed electrical signal to a single wavelength ($\lambda_1$) optical carrier, and multiplexes the upstream $\lambda_1$ optical carrier with the downstream ($\lambda_2$, $\lambda_3$) optical carriers from OB 101. The resulting multi-wavelength ($\lambda_1$, $\lambda_2$, $\lambda_3$) optical beam OB 103 is transmitted from LN1 104 to LN2 106. LN2 106 strips the downstream $\lambda_2$ optical carrier from OB 103, processes it, converts it to an electrical signal (not shown), and transmits the downstream electrical signal to US2 136. The downstream $\lambda_2$ optical carrier is terminated at LN2 106 to prevent recirculation in FR 110. Upstream traffic from US2 136 is transmitted via an upstream electrical signal (not shown) to LN2 106, which processes the electrical signal, converts it to an upstream $\lambda_2$ optical carrier, and multiplexes the upstream $\lambda_2$ optical carrier with the upstream $\lambda_1$ optical carrier from LN1 104 and the remaining downstream $\lambda_3$ optical carrier from OB 101.

The resulting multi-wavelength ($\lambda_1$, $\lambda_2$, $\lambda_3$) optical beam OB 105 is transmitted from LN2 106 to LN3 108, which similarly processes the $\lambda_3$ optical carrier. Multi-wavelength ($\lambda_1$, $\lambda_2$, $\lambda_3$) optical beam OB 107, which carries the upstream traffic from LN1 104-LN3 108, is transmitted to HN 102. If the destination address of a data stream is outside of OTN 100, then HN 102 transmits the data stream to core network 132 via multi-wavelength ($\lambda_1$, $\lambda_2$, $\lambda_3$) optical beam OB 119. If the destination address of a data stream is within OTN 100 (that is, the destination is one of LN1 104-LN3 108), HN 102 transmits the data stream back onto OB 101. Protection traffic on fiber ring FR 112 is similarly processed and transported on optical beams OB 109-OB 115.

In an embodiment, traffic on an optical carrier is transported via a combination of orthogonal frequency division multiple access and time division multiple access (OFDMA/TDMA). As described in more detail below, all traffic flows are transmitted in parallel on a number of orthogonal frequency division multiplexing (OFDM) subcarriers at different wavelengths within the same electrical baseband. A combination of different subcarriers and different time slots may be dynamically allocated to different types of traffic flows or different local nodes via a media access control (MAC) protocol. All subcarriers may be accessed by the hub node and all the local nodes. Separate subcarriers are reserved for a control channel which carries control frames around the ring. The control frames implement a hybrid OFDMA/TDMA-based MAC protocol.

Within the ring, downstream bandwidth is dedicated for transmission from the hub node, but upstream bandwidth is shared among all the local nodes. The hub node exercises central control of the upstream bandwidth. The hub node and all the local nodes communicate over a dedicated common control channel in a time division multiplex (TDM) scheme. Each local node may request a portion of the upstream bandwidth. In an embodiment, as described in more detail below, a reservation-based MAC protocol uses a polling/request/grant mechanism for bandwidth resource reservation. The transmission opportunities computed by a scheduler in the hub node are granted via the control channel. A local node requests an allocation and reports queue lengths of data awaiting transmission (see details below). The hub node receives all the requests and queue lengths from the local nodes, and then sends back specific allocations to each local node. A local node then starts the data transmission on the designated time slots and subcarriers. Multiple packets are grouped into one data burst to utilize bandwidth more efficiently. The centralized scheduler in the hub node assigns the downstream bandwidth to itself and appropriate slots and subcarriers to the local nodes to ensure that collisions do not occur. It also aims to maximize the ring bandwidth utilization, and ensure a minimum rate for each node (that is, fairness). Scheduling and bandwidth allocation is a function of user-defined parameters such as quality of service (QoS), delay time, priority, queue lengths, and input data rate. One skilled in the art may develop embodiments of scheduling and bandwidth allocation algorithms for specific network configurations and applications.

Details of a local node are discussed below. In an embodiment, the essential features of a hub node, such as HN 102, are similar to those of a local node, such as LN1 104. A hub node, however, has additional physical and functional features. On the physical level, a hub node has a multi-wavelength optical transmitter, whereas a local node has a single-wavelength optical transmitter. (Note that a multi-wavelength optical transmitter may refer to a set of single-wavelength optical transmitters, each emitting at a different wavelength.) On the functional level, a hub node performs the centralized control functions for the ring network. A hub node may also serve as a gateway between the ring network and a core network. One skilled in the art may develop embodiments of a hub node from details of a local node described below.

FIG. 1(*b*) shows a detailed schematic of a representative local node, LN1 104 in FIG. 1(*a*). Interface 1140 is the entrance point of FR 110 to LN1 104. Interface 1142 is the exit point of LN1 104 to FR 110. Interface 1144 is the entrance point of FR 112 to LN1 104. Interface 1146 is the exit point of LN1 104 to FR 112. Interface 1148 is the electrical interface between LN1 104 and US1 134. In general, interface 1148 is a bi-directional interface.

In the embodiment shown in FIG. 1(*b*), LN 104 comprises three main modules: optical ring interface module 104-A, signal processing module 104-B, and media access control module 104-C. Details of each module are discussed below.

Optical ring interface module 104-A performs optical processing, optical-to-electronic conversion, and electronic-to-optical conversion. Multi-wavelength ($\lambda_1$, $\lambda_2$, $\lambda_3$) optical beam OB 101 carrying downstream working traffic on FR 110 from HN 102 enters LN1 104 at interface 1140 and is amplified by a variable gain optical amplifier OA 148, which may be, for example, an erbium-doped fiber amplifier (EFDA). The amplified optical beam 143 is split into two optical beams, OB 147 and OB 145, by optical splitter 150, which, in this example, has a 50/50 split ratio. OB 147 is transmitted through wavelength filter 152, which terminates the downstream $\lambda_1$ optical carrier and transmits the downstream ($\lambda_2$, $\lambda_3$) optical carriers. Wavelength filter 152 may be a wavelength selective switch or a thin-film filter, for example. The filtered optical beam OB 149 is then transmitted to optical coupler 154 which multiplexes the downstream ($\lambda_2$, $\lambda_3$) optical carriers with the upstream $\lambda_1$ optical carrier from optical beam OB 151, which is discussed below. Referring back to optical splitter 150, OB 145 is transmitted to optical switch 166. Further processing of OB 145 is discussed below.

Similarly, protection traffic is transmitted on FR 112 from LN2 106 to LN1 104 via multi-wavelength ($\lambda_1, \lambda_2, \lambda_3$) optical beam OB 113, which enters LN1 104 at interface 1144. OB 113 is amplified by optical amplifier OA 156, and the amplified optical beam OB 153 is split by optical splitter 158 into two optical beams, OB 155 and OB 157. OB 155 is transmitted to optical switch 166. OB 157 is transmitted to wavelength filter 160, which terminates the $\lambda_1$ optical carrier and transmits the ($\lambda_2, \lambda_3$) optical carriers. The filtered optical beam OB 159 is then transmitted to optical coupler 162, which multiplexes OB 159 with the upstream $\lambda_1$ optical carrier from optical beam OB 161, which is discussed below. The resulting multi-wavelength ($\lambda_1, \lambda_2, \lambda_3$) optical beam OB 115, which exits LN1 104 at interface 1146, is then transmitted to HN 102. Optical switch 166 switches traffic between FR 110 and FR 112. Optical switch 166, optical coupler 150, optical coupler 154, optical coupler 158, optical coupler 162, and optical coupler 164 provide the uni-directional path switched ring protection function.

To simplify the discussion, the examples below include only the working traffic. One skilled in the art may develop embodiments for protection traffic. Optoelectronic processing within optical ring interface module 104-A proceeds as follows. The downstream data stream is first discussed. As described above, OB 145 transports the downstream ($\lambda_1, \lambda_2, \lambda_3$) optical carriers. OB 145 is routed via optical switch 166. The switched optical beam, denoted OB 145-O, is transmitted to a parallel signal detector PSD 172, which can receive multiple optical signals at different wavelengths simultaneously (through baseband frequency mirroring and bandpass filtering). PSD 172 transforms the optical signal (carried on OB 145-O) to an analog electrical signal, denoted as ES 145-E, which is then digitized by analog-to-digital converter ADC 174. The resulting digital electrical signal, denoted ES 163, is then transmitted to signal processing module 104-B. Further details of the signal processing are discussed below.

Processing of the upstream data stream within optical ring interface module 104-A proceeds as follows. Upstream data from the signal processing module 104-B (discussed further below) is transmitted to optical ring interface module 104-A via digital electrical signal ES 181, which is then converted to analog electrical drive signal ES 183-E by digital-to-analog converter 170. ES 183-E drives optical transmitter 168, which may include, for example, a single wavelength ($\lambda_1$) laser diode. The resulting optical beam OB 183-O emitted by optical transmitter 168 is then transmitted to optical splitter 164, which splits OB 183-O into two optical beams, denoted OB 151 and OB 161. OB 151, which carries the working upstream $\lambda_1$ optical carrier, is transmitted to optical coupler 154, which multiplexes OB 151 with OB 149, which carries the working downstream ($\lambda_2, \lambda_3$) optical carriers, to generate multi-wavelength ($\lambda_1, \lambda_2, \lambda_3$) optical beam OB 103, which is transmitted into FR 110 via interface 1142. Similarly, OB 161, which carries the protection upstream $\lambda_1$ optical carrier, is transmitted to optical coupler 162 and multiplexed with OB 159 to generate optical beam OB 115, which is transmitted into FR 112 via interface 1146.

Signal processing in signal processing module 104-B proceeds as follows. In an embodiment, signal processing module 104-B is implemented by a field programmable gate array (FPGA)-based digital signal processor (DSP). In the downstream path, radio-frequency (RF) digital electrical signal ES 163 from the output of ADC 174 is processed by digital I/Q mixer 1130, which comprises divider 190, local oscillator 196 (frequency $f_c$), mixer 192, mixer 198, and $\pi/2$ phase shifter 194. The outputs of digital I/Q mixer 1130 are electrical signal ES 169, which is the quadrature-phase (Q) signal, and electrical signal ES 171, which is the in-phase (I) signal. ES 169 and ES 171 are inputted into Fast Fourier Transform (FFT) processor 1100. The output of FFT processor 100 is inputted into digital demodulator 1102, which may, for example, be a 16-QAM (Quadrature Amplitude Modulation) demodulator. The output of digital demodulator 1102, denoted electrical signal ES 173, is inputted into the subcarrier and time slot allocation and assignment (STAA) module 1104. Herein, the combination of digital I/Q mixer 1130, FFT processor 1100, and digital demodulator 1102 is referred to as orthogonal frequency division demultiplexer 1160. In an embodiment, signal processing module 104-B may also include a time division demultiplexer (not shown).

The processing of the upstream path is similar. Electrical signal ES 175 is outputted from STAA module 1104 into digital modulator 188, which may, for example, be a 16-QAM modulator. The output of digital modulator 188 is inputted into Inverse Fast Fourier Transform (IFFT) processor 186. The outputs of IFFT processor 186 are electrical signal ES 177 [in-phase (I) signal] and electrical signal ES 179 [quadrature-phase (Q) signal]. ES 177 and ES 179 are processed by digital I/Q mixer 1141 to yield RF digital signal ES 181, which is inputted into digital-to-analog converter DAC 170. Digital I/Q mixer 1141 comprises mixer 178, mixer 184, local oscillator 182, $\pi/2$ phase shifter 180, and combiner 176. Herein, the combination of digital modulator 188, IFFT processor 177, and digital I/Q mixer 1141 is referred to herein as orthogonal frequency division multiplexer 1170. In an embodiment, signal processing module 104-B may also include a time division multiplexer (not shown).

Figure 1B:
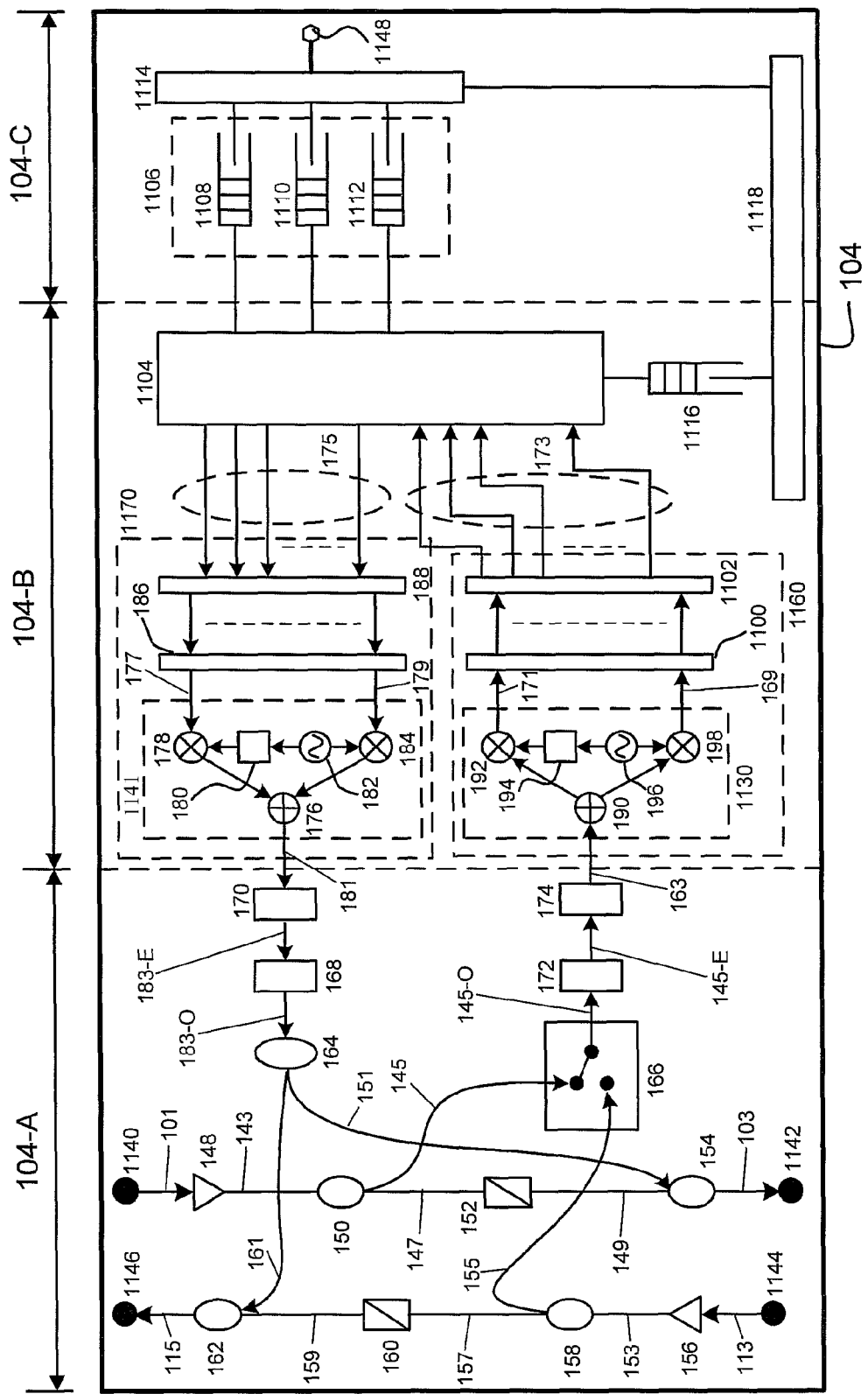
FIG. 1(b) shows a schematic of a local node.

In FIG. 1(b), processing in the MAC module 104-C proceeds as follows. Referring back to FIG. 1(a), data packets transmitted from user system 134 to LN2 106, LN3 108, and HN 102 are transported on electrical signal ES 123 into user interface 1148 of LN2 104. Similarly, data packets transmitted from LN2 106, LN3 108, and HN 102 to LN1 104 are transported on electrical signal ES 121 out of user interface 1148 to user system 134. In an embodiment, packets that are waiting from transmission from and to user interface 1148 are stored in set of multiple virtual queues. Virtual queues include virtual output queues and virtual input queues.

In the embodiment shown in FIG. 1(b), VoQ memory module 1106 holds a set of individual virtual output queues. VoQ[1,2] 1108 is the virtual output queue for packets awaiting transmission from LN1 104 to LN2 106. VoQ[1,3] 1110 is the virtual output queue for packets awaiting transmission from LN1 104 to LN3 108. VoQ[1,H] 1112 is the virtual output queue for packets awaiting transmission from LN1 104 to HN 102. As discussed above, packets with destinations outside of OTN 100 are first routed to HN 102 as well. VoQ[CC] 1116 is a special virtual output queue for messages sent from LN1 104 to HN 102 along a dedicated control channel (discussed below). For simplicity, FIG. 1(b) does not show corresponding individual virtual input queues for packets transmitted from LN2 106 to LN1 104, from LN3 108 to LN1 104, and from HN 102 to LN1 104. Incoming packets are stored in the individual virtual input queues while awaiting transmission out from user interface 1148 to user system 134. One skilled in the art may develop embodiments with virtual input queues.

As discussed in further detail below, a resource unit (RU), which comprises a set of subcarriers and time slots, is assigned to a VoQ. The size of the RU (number of subcarriers and number of time slots) may be dynamically varied in response to user-defined parameters, such as quality of service (QoS), delay time, priority, queue lengths, and input data rate. The control module 1118 and subcarrier and time slot allocation and assignment (STAA) module 1104 are responsible for the bandwidth sharing and for mapping sets of subcarriers and time slots to VoQ 1106. As discussed in more detail below, multiple packets are aggregated into data bursts for more efficient transmission. To dynamically share the OFDMA-based optical ring bandwidth while avoiding collisions, a MAC protocol, as described below, is used. A dedicated control channel (which does not require any additional transceivers) is used to exchange control messages, including the reservation information, which can guarantee QoS.

Figure 2:
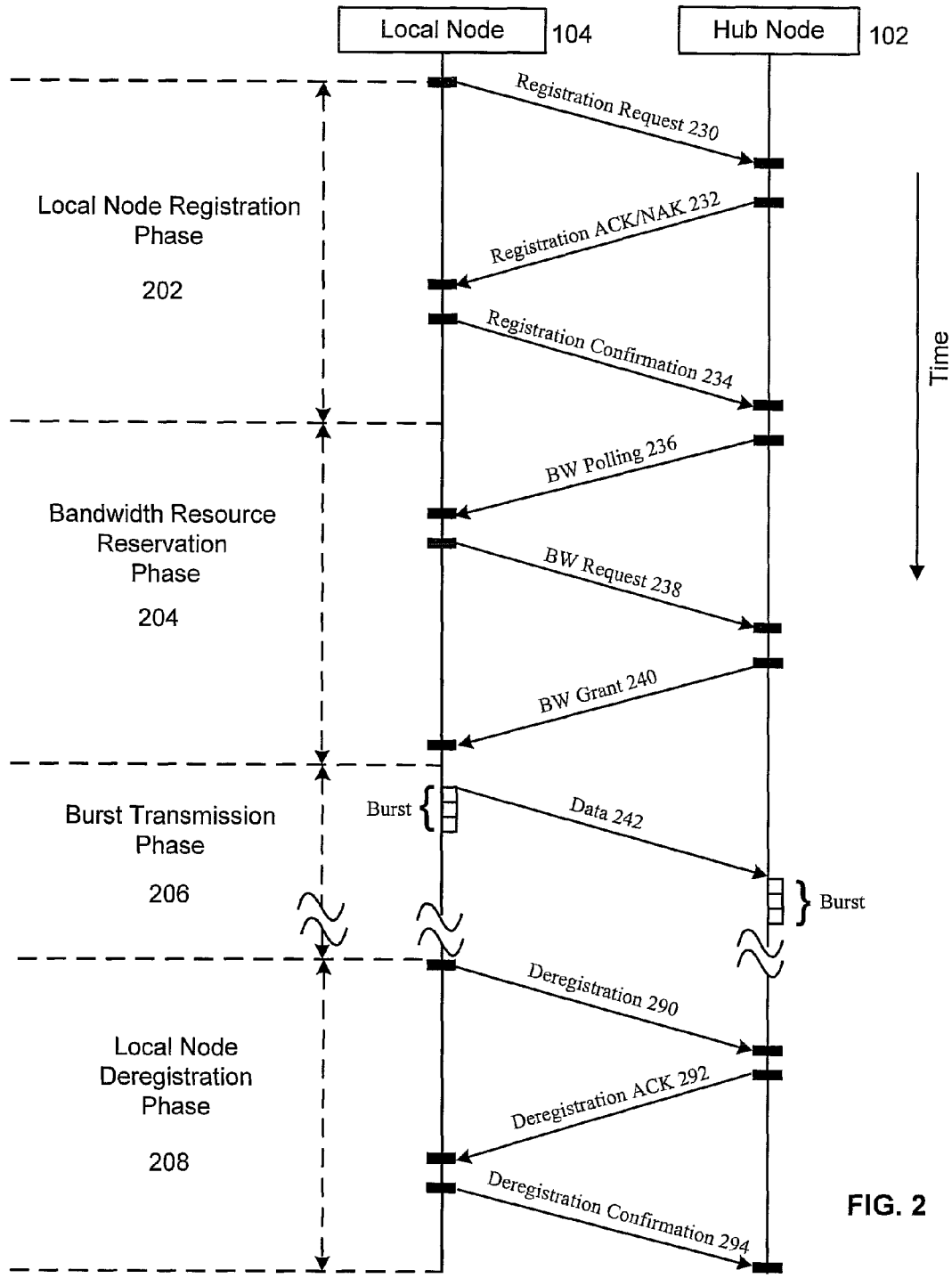
FIG. 2 shows a media access control protocol message flow diagram.

An embodiment of a reservation-based MAC protocol message flow is shown in FIG. 2. It includes four phases: (a) local node registration phase 202, (b) bandwidth (BW) resource reservation phase 204, (c) burst transmission phase 206, and (c) local node deregistration phase 208. Bandwidth resource reservation refers to allocation of time slots and subcarriers. Since the ring is a unidirectional ring, the ring bandwidth is divided into two parts, the downstream bandwidth and the upstream bandwidth. The downstream bandwidth is dedicated to the transmission from the hub node, whereas the upstream bandwidth is shared among all local nodes.

In the example shown in FIG. 2, control messages are exchanged between local node LN1 104 and hub node HN 102 [see FIG. 1(a)] on a dedicated control channel. To start communications, LN1 104 first registers with HN 102. During the local node reservation phase 202, LN1 104 first sends Registration Request 230 to HN 102, which responds with Registration ACK/NAK 232. An ACK (Acknowledgement) indicates that registration has been processed. A NAK (No Acknowledgement) indicates that registration has not been processed. Upon receipt of an ACK, LN1 104 sends Registration Confirmation 234 to HN 102. LN1 104 is then registered with HN 102.

The bandwidth resource reservation phase 204 is then entered. HN 102 polls LN1 104 for bandwidth requests. HN 102 sends BW Polling 236 to LN1 104, which responds with BW Request 238. In an embodiment, BW Request 238 may also report queue lengths (for example, queue lengths in VoQ 1106) to HN 102. Upon receipt of BW Request 238, HN 102 then sends BW Grant 240 to LN1 104. Once BW Grant 240 has been received by LN1 104, the burst transmission phase 206 is entered. LN1 104 transmits Data Burst 242 to HN 102. Data Burst 242 includes packets from VoQ 1106, for example. The sequence of BW Polling-BW Request-BW Grant-Data Burst may be repeated multiple times during burst transmission phase 206. When LN1 104 no longer wishes to communicate with HN 102, the local node deregistration phase 208 is entered. LN1 104 sends Deregistration 290 to HN 102, which deregisters LN1 104 and responds with Deregistration ACK 292. Upon receipt of Deregistration ACK 292, LN1 104 returns Deregistration Confirmation 294 to HN 102. LN1 104 is then deregistered.

Figure 3:
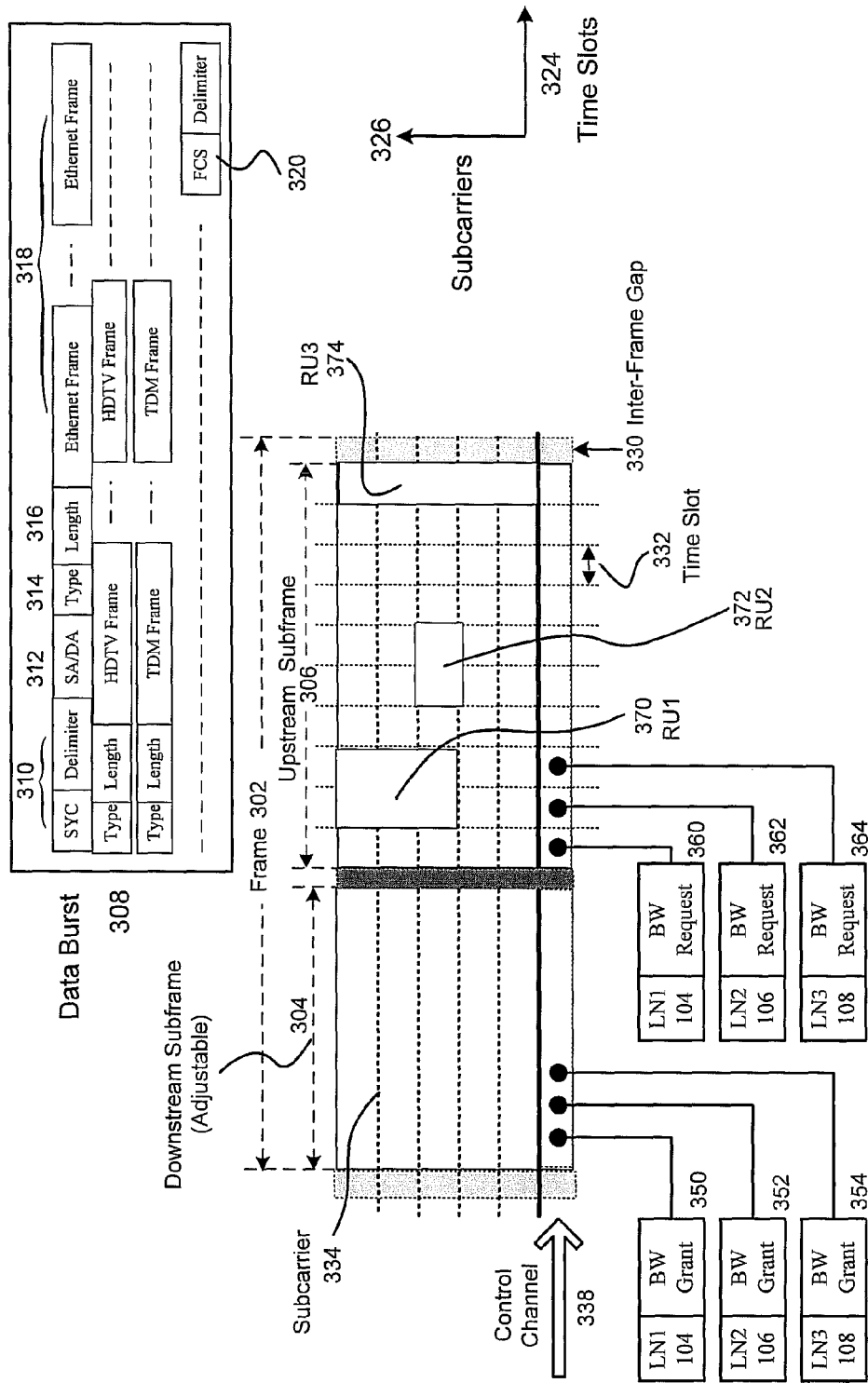
FIG. 3 shows a schematic of a data frame.

In the embodiment shown in FIG. 3, data is transmitted in a series (sequence) of frames (also referred to as scheduling cycles). Sequential frames are separated by an inter-frame gap 330. Frame 302 comprises one downstream subframe 304 and one upstream subframe 306. Downstream subframe 304 and upstream subframe 306 are also separated by a gap. The downstream subframe 304 is used only for transmission by the hub node [such as HN 102 in FIG. 1(a)]. The length of downstream subframe 304 is adjustable to accommodate varying traffic volume in the hub node. Herein, the length of the downstream subframe is referred to as the downstream subframe time period. The upstream subframe 306 is divided into multiple time slots. A representative time slot is shown as time slot 332. In an embodiment, the length of time slot 332 is 125 µs. In general, the length of a time slot is user-specified. In general, the length of a frame may vary from one frame to another. In general, the length of a downstream subframe may vary from one frame to another. In general, the length of an upstream subframe may vary from one frame to another.

In FIG. 3, the subcarriers are mapped along the vertical axis 326, and the time slots are mapped along the horizontal axis 324. A representative subcarrier is subcarrier 334. Herein, a resource unit (RU) refers to a block of subcarriers and time slots. In general, the number of subcarriers and the number of time slots in a resource unit are user-specified. In general, the number of subcarriers and the number of time slots in a resource unit may vary from one resource unit to another (compare, for example, RU1 370-RU3 374). A set of resource units are reserved exclusively for the control channel 338.

The hub node may allocate each local node [such as LN1 104-LN3 108 in FIG. 1(a)] a resource unit with which a local node may write information during each frame transmission. As discussed above, allocation is provided by the reservation-based MAC protocol utilizing the poll/request/grant mechanism previously described in FIG. 2. Control messages are exchanged between the hub node and the local nodes via control channel 338. HN 102 controls scheduling of resources and may guarantee an RU to each local node during each frame. Fairness and access delay depend on the bandwidth allocation algorithm and on the values of parameters such as the length of the scheduling cycle.

In FIG. 3, for example, hub node HN 102 sends BW Grant message 350-BW Grant message 354 to LN1 104-LN3 108, respectively. A BW grant message allocates a RU to a local node. For example, BW Grant message 350-BW Grant message 354 allocate RU1 370-RU3 374 to LN1 104-LN3 108, respectively. BW Grant message 350-BW Grant message 354 are sent by HN 102 in response to BW Request messages sent by LN1 102-LN3 108 in the previous frame. BW Request message 360-BW Request message 364 are sent from LN1 104-LN3 108 (via control channel 338) to HN 102 to request RUs in the next frame. As described above, BW Request message 360-BW Request message 364 may also report queue lengths of LN1 104-LN3 108, respectively, to HN 102.

When a local node transmits upstream data, it first aggregates multiple data packets into a single data burst for more efficient upstream bandwidth utilization. In general, the number of data packets in a single data burst is user-specified. In general, the length of a data burst may vary. In the embodiment shown in FIG. 3, data burst 308 transmitted during RU3 374 has the following fields: (a) synchronization/delimiter fields 310, (b) source address/destination address (SA/DA) 312, (c) type of traffic 314, (c) burst length 316, and (d) payloads 318. There is also a frame check sequence FCS 320. In general, different types of traffic may be transmitted within a single data burst. Types of traffic include, for example, Ethernet, high-definition television (HDTV), and time division multiplexed (TDM). One skilled in the art may develop embodiments of resource units with other structures and fields.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A fiber optic network for transmitting data between a plurality of user systems, comprising:
   a hub node, comprising:
      a multi-wavelength optical transmitter configured to transmit a plurality of downstream optical carriers to at least one uni-directional fiber ring, each of said plurality of downstream optical carriers having a corresponding specific downstream wavelength selected from a plurality of wavelengths;
      a first multiplexer configured to orthogonal frequency division multiplex a corresponding specific downstream data stream onto each of said plurality of downstream optical carriers;
      a first parallel signal detector configured to receive from the at least one unidirectional fiber ring a plurality of upstream optical carriers, each of said plurality of upstream optical carriers having a corresponding specific upstream wavelength selected from said plurality of wavelengths and each of said plurality of upstream optical carriers carrying a corresponding specific upstream data stream multiplexed by orthogonal frequency division multiplexing; and
      a first demultiplexer configured to orthogonal frequency division demultiplex each of said corresponding specific upstream data streams;
   a first local node configured to communicate with a first user system selected from said plurality of user systems, comprising:
      a first single-wavelength optical transmitter configured to transmit to said at least one uni-directional fiber ring a first upstream optical carrier having a corresponding first upstream wavelength selected from said plurality of wavelengths;
      a second multiplexer configured to orthogonal frequency division multiplex a corresponding first upstream data stream onto said first upstream optical carrier;
      a second parallel signal detector configured to receive said plurality of downstream optical carriers; and
      a second demultiplexer configured to orthogonal frequency division demultiplex a corresponding specific downstream data stream on the specific downstream optical carrier whose corresponding specific downstream wavelength is equal to said corresponding first upstream wavelength; and
   a second local node configured to communicate with a second user system selected from said plurality of user systems, comprising:
      a second single-wavelength optical transmitter configured to transmit to said at least one unidirectional fiber ring a second upstream optical carrier having a corresponding second upstream wavelength selected from said plurality of wavelengths;
      a third multiplexer configured to orthogonal frequency division multiplex a corresponding second upstream data stream onto said second upstream optical carrier;
      a third parallel signal detector configured to receive said plurality of downstream optical carriers; and
      a third demultiplexer configured to orthogonal frequency division demultiplex a corresponding specific downstream data stream on the specific downstream optical carrier whose corresponding specific downstream wavelength is equal to said corresponding second upstream wavelength.

2. The fiber optic network of claim 1, wherein said at least one unidirectional fiber ring comprises:
   a working ring and a protection ring configured as a unidirectional path switched ring.

3. The fiber optic network of claim 2, wherein said hub node further comprises:
   a first optical switch configured to switch upstream and downstream traffic between said working ring and said protection ring.

4. The fiber optic network of claim 2, wherein said first local node further comprises:
   a second optical switch configured to switch upstream and downstream traffic between said working ring and said protection ring.

5. The fiber optic network of claim 2, wherein said second local node further comprises:
   a third optical switch configured to switch upstream and downstream traffic between said working ring and said protection ring.

6. The fiber optic network of claim 1, wherein said first multiplexer is further configured to orthogonal frequency division multiplex and time division multiplex a corresponding specific downstream data stream onto each of said plurality of downstream optical carriers.

7. The fiber optic network of claim 1, wherein said first demultiplexer is further configured to orthogonal frequency division demultiplex and time division demultiplex each of said corresponding specific upstream data stream.

8. The fiber optic network of claim 1, wherein said hub node further comprises:
   a first virtual output queue module configured to store a first plurality of data packets in a first plurality of virtual output queues, said first plurality of data packets awaiting transmission to said at least one unidirectional fiber ring;
   a first controller configured to control transmission of a first set of data packets selected from said first plurality of virtual output queues; and
   a first subcarrier and time slot allocation and assignment module configured to map said first set of data packets to a first set of subcarriers and a first set of time slots.

9. The fiber optic network of claim 8, wherein said first controller is further configured to control:
   transmission of first upstream traffic from said first local node; and
   transmission of second upstream traffic from said second local node.

10. The fiber optic network claim 1, wherein said first local node further comprises a first wavelength selective filter configured to:
    terminate the specific downstream optical carrier whose corresponding specific downstream wavelength is equal to said corresponding first upstream optical wavelength; and
    transmit the other downstream optical carriers in said plurality of downstream optical carriers.

11. The fiber optic network of claim 1, wherein said second multiplexer is further configured to orthogonal frequency division multiplex and time division multiplex a corresponding first upstream data stream onto said first upstream optical carrier.

12. The fiber optic network of claim 1, wherein said second demultiplexer is further configured to orthogonal frequency division demultiplex and time division demultiplex each of said corresponding specific downstream data stream.

13. The fiber optic network of claim 1, wherein said first local node further comprises:
   a second virtual output queue module configured to store a second plurality of data packets in a second plurality of virtual output queues, said second plurality of data packets awaiting transmission to said at least one uni-directional fiber ring;
   a second controller configured to control transmission of a second set of data packets selected from said second plurality of virtual output queues; and
   a second subcarrier and time slot allocation and assignment module configured to map said second set of data packets to a second set of subcarriers and a second set of time slots.

14. The fiber optic network of claim 1, wherein said second local node further comprises a second wavelength selective filter configured to:
   terminate the specific downstream optical carrier whose corresponding specific downstream wavelength is equal to said corresponding second upstream optical wavelength; and
   transmit the other downstream optical carriers in said plurality of downstream optical carriers.

15. The fiber optic network of claim 1, wherein said third multiplexer is further configured to orthogonal frequency division multiplex and time division multiplex a corresponding second upstream data stream onto said second upstream optical carrier.

16. The fiber optic network of claim 1, wherein said third demultiplexer is further configured to orthogonal frequency division demultiplex and time division demultiplex each of said corresponding specific downstream data stream.

17. The fiber optic network of claim 1, wherein said second local node further comprises:
   a third virtual output queue module configured to store a third plurality of data packets in a third plurality of virtual output queues, said third plurality of data packets awaiting transmission to said at least one unidirectional fiber ring;
   a third controller configured to control transmission of a third set of data packets selected from said third plurality of virtual output queues; and
   a third subcarrier and time slot allocation and assignment module configured to map said third set of data packets to a third set of subcarriers and a third set of time slots.

18. The fiber optic network of claim 1, further comprising M additional local nodes connected to said at least one unidirectional fiber ring, wherein M is an integer greater than or equal to one.

19. A method for transmitting data between a hub node and a plurality of local nodes connected by at least one unidirectional fiber ring, comprising the steps of:
   transmitting from said hub node into said at least one unidirectional fiber ring a first downstream optical carrier having a first wavelength and a second downstream optical carrier having a second wavelength, wherein:
      said first downstream optical carrier carries a first downstream orthogonal division multiplexed data stream, and
      said second downstream optical carrier carries a second orthogonal division multiplexed data stream;
   receiving from said at least one unidirectional fiber ring at a first local node, selected from said plurality of local nodes, said first downstream optical carrier and said second downstream optical carrier;
   orthogonal frequency division demultiplexing at said first local node said first downstream orthogonal division multiplexed data stream;
   terminating at said first local node said first downstream optical carrier;
   transmitting from said first local node into said at least one unidirectional fiber ring a first upstream optical carrier having said first wavelength, said first upstream optical carrier carrying a first upstream orthogonal division multiplexed data stream;
   receiving from said at least one unidirectional fiber ring at a second local node, selected from said plurality of local nodes, said second downstream optical carrier and said first upstream optical carrier;
   orthogonal frequency demultiplexing at said second local node said second downstream orthogonal division multiplexed data stream;
   terminating at said second local node said second downstream optical carrier;
   transmitting from said second local node into said at least one uni-directional fiber ring a second upstream optical carrier having said second wavelength, said second upstream optical carrier carrying a second upstream orthogonal division multiplexed data stream;
   receiving from said at least one unidirectional fiber ring at said hub node said first upstream optical carrier and said second upstream optical carrier; and
   orthogonal frequency division demultiplexing at said hub node said first upstream orthogonal division multiplexed data stream and said second upstream orthogonal division multiplexed data stream.

20. The method of claim 19, wherein said at least one unidirectional fiber ring comprises:
   a working ring and a protection ring configured as a unidirectional path switched ring.

21. The method of claim 19, wherein said first downstream orthogonal division multiplexed data stream, said second downstream orthogonal division multiplexed data stream, said first upstream orthogonal division multiplexed data stream, and said second upstream orthogonal division multiplexed data stream are transported on a sequence of frames, each frame comprising:
   a downstream subframe comprising a first plurality of subcarriers and a downstream subframe time period;
   an upstream subframe comprising a second plurality of subcarriers and a plurality of time slots.

22. The method of claim 21, wherein said upstream subframe further comprises:
   a plurality of specific resource units, each specific resource unit comprising a specific set of subcarriers selected from said second plurality of subcarriers and a specific set of time slots selected from said plurality of time slots.

23. The method of claim 22, further comprising the steps of:
   controlling the step of transmitting from said first local node by exchanging via a dedicated control channel a first set of control messages between said hub node and said first local node; and
   controlling the step of transmitting from said second local node by exchanging via said dedicated control channel a second set of control messages between said hub node and said second local node.

24. The method of claim 23, wherein the step of exchanging the first set of control messages comprises the steps of:
   sending a first bandwidth polling message from said hub node to said first local node;

sending a first bandwidth request message from said first local node to said hub node in response to said first bandwidth polling message; and sending a first bandwidth grant message from said hub node to said first local node in response to said first bandwidth request message.

25. The method of claim 24, wherein said first bandwidth request message reports lengths of virtual queues in said first local node.

26. The method of claim 24, further comprising the step of:

sending a first data burst from said first local node to said hub node in response to said first bandwidth grant message.

27. The method of claim 26, wherein said first data burst is sent in a first set of specific resource units allocated by said hub node via said first bandwidth grant message.

28. The method of claim 27, wherein said first set of specific resources units is allocated based at least in part on at least one of:

priority of said data burst,
quality of service of said data burst,
virtual queue lengths in said first local node, and
available specific resource units.

29. The method of claim 26, wherein said first data burst comprises at least one of:

synchronization field,
delimiter field,
source address/destination address field,
type of traffic field,
burst length field, and
payloads.

30. The method of claim 29, wherein said payloads comprise:

Internet Protocol (IP) data packets,
Ethernet frames,
High Definition Television frames, and
Time Division Multiplex frames.

* * * * *